United States Patent
Diaconu

(10) Patent No.: US 10,430,230 B2
(45) Date of Patent: *Oct. 1, 2019

(54) TRANSACTION REDO USING SKIP ELEMENT FOR OBJECT

(71) Applicant: MICROSOFT TECHNOLOGY LICENSING, LLC, Redmond, WA (US)

(72) Inventor: Cristian Diaconu, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/959,211

(22) Filed: Apr. 21, 2018

(65) Prior Publication Data

US 2018/0239634 A1    Aug. 23, 2018

Related U.S. Application Data

(63) Continuation of application No. 14/686,515, filed on Apr. 14, 2015, now Pat. No. 9,959,137.

(51) Int. Cl.
| | |
|---|---|
| *G06F 3/00* | (2006.01) |
| *G06F 9/46* | (2006.01) |
| *G06F 9/48* | (2006.01) |
| *G06F 9/54* | (2006.01) |

(52) U.S. Cl.
CPC ............ *G06F 9/466* (2013.01); *G06F 9/4881* (2013.01); *G06F 9/54* (2013.01)

(58) Field of Classification Search
CPC ........................................... G06F 9/54
USPC ....................................... 719/310
See application file for complete search history.

(56) References Cited

U.S. PATENT DOCUMENTS

| | | | |
|---|---|---|---|
| 5,721,815 A | 2/1998 | Ottesen et al. | |
| 6,557,048 B1 * | 4/2003 | Keller | G06F 13/4059 710/58 |
| 8,850,452 B2 * | 9/2014 | Karakkattillathu Vishnu Namboothiri | G06F 11/3476 718/100 |
| 9,138,652 B1 | 9/2015 | Thompson et al. | |

(Continued)

OTHER PUBLICATIONS

Donald Wayne Carr, A real-time active database for high transaction loads and moderate deadlines. (Year: 1998).*

(Continued)

*Primary Examiner* — Lechi Truong
(74) *Attorney, Agent, or Firm* — Workman Nydegger

(57) ABSTRACT

The use of a skip element when redoing transactions, so as to avoid tracking dependencies between transactions assigned to different threads for parallel processing. When the second thread comes to a second task in the course of redoing a second transaction, if a first task that is mooted by the second task is not already performed, the second thread inserts a skip element associated with the object to be operated upon by the particular task, instead of actually performing the particular task upon the object. When the first thread later comes to the first task in the course of redoing a first transaction, the first thread encounters the skip element associated with the object. Accordingly, instead of performing the dependee task, the first thread skips the dependee task and perhaps removes the skip element. The result is the same regardless of whether the first or second task is redone first.

20 Claims, 10 Drawing Sheets

(56) References Cited

U.S. PATENT DOCUMENTS

| | | | |
|---|---|---|---|
| 9,626,394 B2 | 4/2017 | Schmidt et al. | |
| 2002/0103683 A1* | 8/2002 | Tsuda | G06Q 10/04 705/7.26 |
| 2002/0120929 A1 | 8/2002 | Schwalb et al. | |
| 2009/0287890 A1 | 11/2009 | Bolosky | |
| 2011/0202546 A1 | 8/2011 | Amit et al. | |
| 2012/0059798 A1 | 3/2012 | Madhavarapu et al. | |
| 2012/0109895 A1 | 5/2012 | Zwilling et al. | |
| 2015/0127679 A1* | 5/2015 | Wing | G06F 11/0793 707/770 |
| 2016/0306654 A1 | 10/2016 | Diaconu | |

OTHER PUBLICATIONS

"Final Office Action Issued in U.S. Appl. No. 14/686,494", dated May 7, 2018, 25 Pages.

"Non Final Office Action Issued in U.S. Appl. No. 14/686,494", dated Oct. 23, 2018, 35 Pages.

Ferri, Cesare, et al., "Energy Efficient Synchronization Techniques for Embedded Architectures", In Proceedings of the 18th ACM Great Lakes symposium on VLSI, ACM, pp. 435-440.

"Non Final Office Action Issued in U.S. Appl. No. 14/686,560", dated Jan. 11, 2019, 22 Pages.

"Final Office Action Issued in U.S. Appl. No. 14/686,494", dated May 16, 2019, 39 Pages.

"Final Office Action Issued in U.S Appl. No. 14/686,560", dated Jun. 20, 2019, 24 Pages.

\* cited by examiner

TRANSACTION REDO USING SKIP ELEMENT FOR OBJECT

CROSS-REFERENCE TO RELATED APPLICATIONS

This application is a continuation of U.S. patent application Ser. No. 14/686,515 filed on Apr. 14, 2015, entitled "TRANSACTION REDO USING SKIP ELEMENT FOR OBJECT," which issued as U.S. Pat. No. 9,959,137 on May 1, 2018, and which application is expressly incorporated herein by reference in its entirety.

BACKGROUND

Computing systems and associated networks have revolutionized the way human beings work, play, and communicate. Nearly every aspect of our lives is affected in some way by computing systems. The proliferation of networks has allowed computing systems to share data and communicate, vastly increasing information access. For this reason, the present age is often referred to as the "information age".

Often, tasks performed on a data system (such as a database system) are logged. For instance, each tasks performed has an associated entry in a log, with the entry having a log entry identifier (such as a log sequence number). Furthermore, in some cases, tasks are performed as part of a transaction such that either all of the tasks of the transaction are performed (if the transaction is "committed") or none of the tasks of the transaction are performed (if the transaction is "aborted"). Thus, after a transaction initiates, as tasks are performed for the transaction, it is not yet clear whether or not those tasks will be undone due to an abort of the transaction. Only upon a commit of the transaction is it clear that the task is performed.

In data systems that perform transactions in parallel, with tasks of different transactions being completed, the task entries associated with transactions are often interleaved within the log. For instance, the last task of a prior transaction is often completed after the first task of the next transaction is completed, resulting in overlap in tasks associated with neighboring temporal transactions. Often, a subsequent transaction initiated after a prior transaction will complete before the prior transaction is complete, resulting in some reordering of transaction completions.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to the use of a skip element when redoing transactions, so as to avoid tracking dependencies between transactions assigned to different threads for parallel processing. For instance, suppose a first thread redoes a first transaction, and a second thread redoes a second transaction. Now suppose that there is a second task in the second transaction that depends on a first task in the first transaction, and that actually moots the first task. When the second thread comes to the second task in the course of redoing the second transaction, if the first task is not already performed, the second thread inserts a skip element associated with the object to be operated upon by the particular task, instead of actually performing the particular task upon the object. When the first thread later comes to the first task in the course of redoing the first transaction, the first thread encounters the skip element associated with the object. Accordingly, instead of performing the dependee task, the first thread skips the dependee task and perhaps removes the skip element. The net result is as though the dependee task and the particular task never happened at all, which is the same as the result had the dependee task been performed first followed by the particular task that nullified the dependee task.

As an example, the particular task might be to delete a row inserted by the dependee task. If the delete row operation were to happen first, there would be no row to delete, and so the thread can determine that there is a dependee task that has not yet been performed. Accordingly, rather than delete the row (which would be impossible anyway as it has not yet been inserted), the thread instead inserts a skip element associated with the row yet to be created. When the thread that inserts the row is encountered, instead of inserting the row, the thread encounters the skip element, and performs no action at all except for perhaps removing the skip element. The end result is the same (i.e., the row is not present), and dependencies are honored.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

Figure 1:
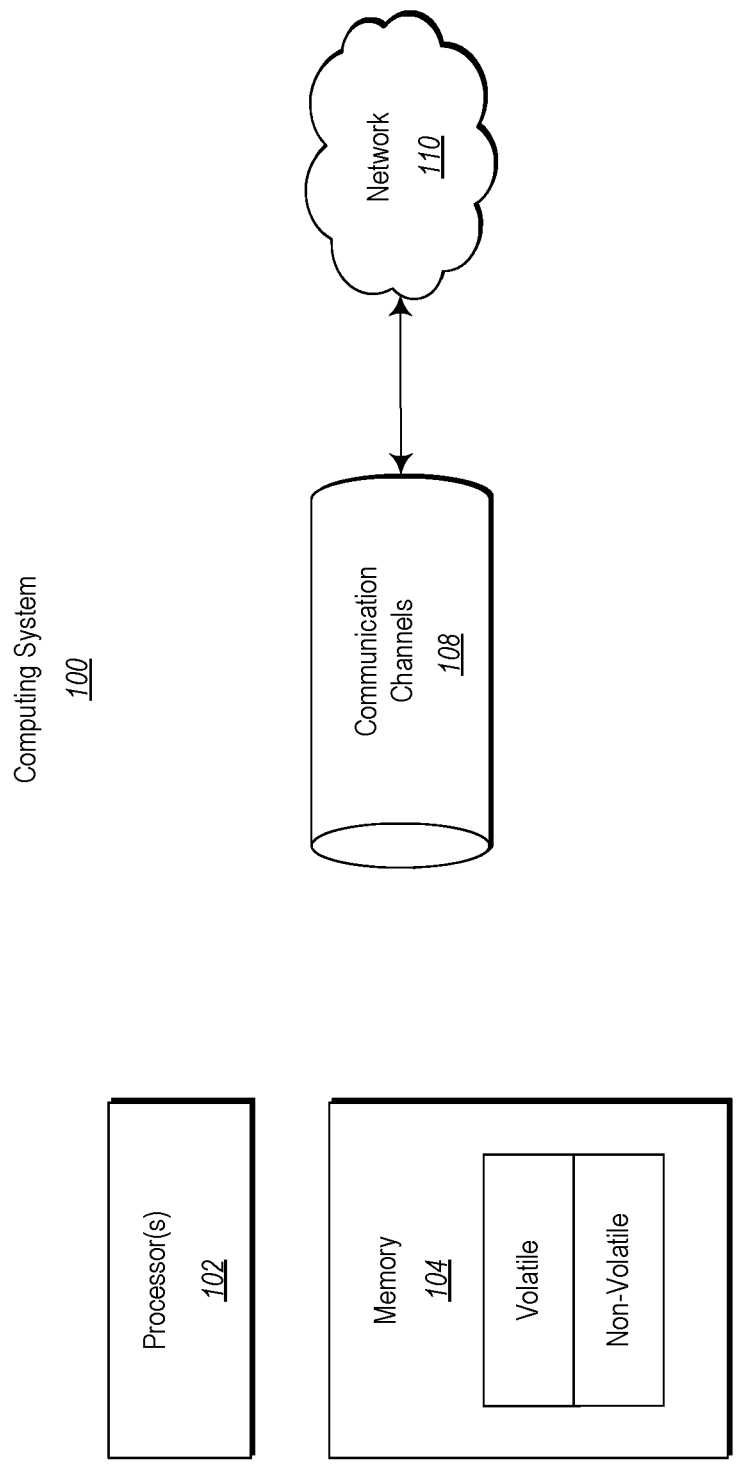
FIG. 1 abstractly illustrates a computing system in which some embodiments described herein may be employed.

At least some embodiments described herein relate to the use of a skip element when redoing transactions, so as to avoid tracking dependencies between transactions assigned to different threads for parallel processing. For instance, suppose a first thread redoes a first transaction, and a second thread redoes a second transaction. Now suppose that there is a second task in the second transaction that depends on a first task in the first transaction, and that actually moots the first task. When the second thread comes to the second task in the course of redoing the second transaction, if the first task is not already performed, the second thread inserts a skip element associated with the object to be operated upon by the particular task, instead of actually performing the particular task upon the object. When the first thread later comes to the first task in the course of redoing the first transaction, the first thread encounters the skip element associated with the object. Accordingly, instead of performing the dependee task, the first thread skips the dependee task and perhaps removes the skip element. The net result is as though the dependee task and the particular task never happened at all, which is the same as the result had the dependee task been performed first followed by the particular task that nullified the dependee task.

As an example, the particular task might be to delete a row inserted by the dependee task. If the delete row operation were to happen first, there would be no row to delete, and so the thread can determine that there is a dependee task that has not yet been performed. Accordingly, rather than delete the row (which would be impossible anyway as it has not yet been inserted), the thread instead inserts a skip element associated with the row yet to be created. When the thread that inserts the row is encountered, instead of inserting the row, the thread encounters the skip element, and performs no action at all except for perhaps removing the skip element. The end result is the same (i.e., the row is not present), and dependencies are honored.

Some introductory discussion of a computing system will be described with respect to FIG. 1. Then, the creation of a transaction segment records will be described with respect to FIGS. 2 through 8. The dispatch and parallel redoing of the transaction segments will thereafter be described with respect to FIGS. 9 through 11.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors (of the associated computing system that performs the act) direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other computing systems over, for example, network 110. The computing system 100 also includes a display, which may be used to display visual representations to a user.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. The computer executable instructions may be, for example, binaries or even instructions that undergo some translation (such as compilation) before direct execution by the processors, such as intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Figure 2:
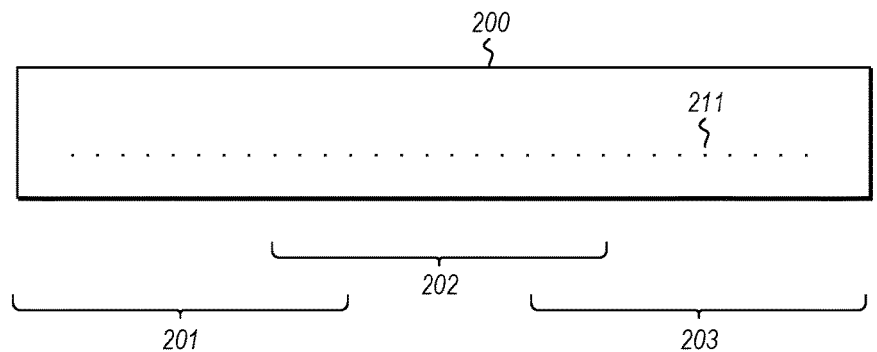
FIG. 2 abstractly illustrates a log that might be kept by a computing system such as the computing system of FIG. 1, in which there are several transaction segments that overlap in log entries.

FIG. 2 abstractly illustrates a log 200 that might be kept by a computing system such as the computing system 100 of FIG. 1. As symbolically represented by represented the continuous ellipses 211, the log 200 is filled with entries associated with tasks performed on the computing system 100. Each task may correspond to an associated transaction. However, since transactions are performed by the computing system 100 in parallel with multiple transactions being active at a time, the order of completion of the transactions is not guaranteed, and often is not, the same as the order that the transactions were initiated. After all, some transactions may be more long running than others just due to the wide variety of transactions that may be performed.

In accordance with the principles described herein, a transaction segment record is created for transactions within a particular transaction identifier range. The transaction segment records are created so that each transaction segment record includes a transaction identifier range that does not overlap with the transaction identifier range of any other transaction segment record, including any neighboring transaction segment record. The transaction identifier range is an example of a transaction identifier set. The transaction identifier set defined in the transaction segment record may include a single transaction identifier or perhaps multiple transaction identifiers. The transaction identifier set is an example of a transaction segment definition that defines which log entries of the log are to be included within that transaction segment based on whether the log entry is a part of any of the transactions identified in the transaction identifier set.

In this description and in the claims, a particular transaction identifier range would "overlap" a comparison transaction identifier range if 1) any transaction identifiers within the particular transaction identifier range was indicative of being a transaction completed (i.e., committed or aborted) between an earliest and latest completed transactions of the comparison transaction identifier range or 2) any transaction identifiers within the comparison transaction identifier range was indicative of being a transaction completed between an earliest and latest completed transactions of the particular transaction identifier range.

For instance, suppose that the computing system assigns monotonically increasing transaction identifiers as new transactions are initiated. Now suppose the particular transaction identifier range included transaction identifiers 4, 6 and 8. Suppose further that the comparison transaction identifier range included transaction identifiers 7, 9 and 10. In that case, the particular transaction identifier range overlaps with the comparison transaction identifier range because the particular transaction identifier range includes a transaction identifier 8 which is indicative of the associated transaction being completed between an earliest completed transaction (having transaction identifier 7) and a latest completed transaction (having transaction identifier 10) of the comparison transaction identifier range. As a separate reason for overlap, the comparison transaction identifier range includes a transaction identifier 7 which is indicative of the associated transaction being completed between an earliest completed transaction (having transaction identifier 4) and a latest completed transaction (having transaction identifier 8) of the particular transaction identifier range.

Now suppose that the comparison transaction identifier range included transaction identifiers 9, 10, 11. Now there is no overlap because both conditions of non-overlap are satisfied. Specifically, the first condition is that the particular transaction identifier range includes no transaction identifiers (the highest being transaction identifier 8) which is indicative of the associated transaction being completed between an earliest completed transaction (having transaction identifier 9) and a latest completed transaction (having transaction identifier 11) of the comparison transaction identifier range. The second condition is that the comparison transaction identifier range includes no transaction identifiers (the lowest being transaction identifier 9) which is indicative of the associated transaction being completed between an earliest completed transaction (having transaction identifier 4) and a latest completed transaction (having transaction identifier 8) of the particular transaction identifier range.

The non-overlapping conditions also apply when the comparison transaction identifier range includes transactions completed earlier than the transactions of the particular transaction identifier range. For instance, suppose that the comparison transaction identifier range includes transaction identifiers 1, 2 and 5. In that case, the particular transaction identifier range overlaps with the comparison transaction identifier range because the particular transaction identifier range includes a transaction identifier 4 which is indicative of the associated transaction being completed between an earliest completed transaction (having transaction identifier 1) and a latest completed transaction (having transaction identifier 5) of the comparison transaction identifier range. As a separate reason for overlap, the comparison transaction identifier range includes a transaction identifier 5 which is indicative of the associated transaction being completed between an earliest completed transaction (having transaction identifier 4) and a latest completed transaction (having transaction identifier 8) of the particular transaction identifier range.

Now suppose that the comparison transaction identifier range included transaction identifiers 1, 2 and 3. Now there is no overlap because both conditions of non-overlap are satisfied. Specifically, the first condition is that the particular transaction identifier range includes no transaction identifiers (the lowest being transaction identifier 4) which is indicative of the associated transaction being completed between an earliest completed transaction (having transaction identifier 1) and a latest completed transaction (having transaction identifier 3) of the comparison transaction identifier range. The second condition is that the comparison transaction identifier range includes no transaction identifiers (the highest being transaction identifier 3) which is indicative of the associated transaction being completed between an earliest completed transaction (having transaction identifier 4) and a latest completed transaction (having transaction identifier 8) of the comparison transaction identifier range.

As an example, suppose there were three transaction segment identifier ranges: a first associated with transaction identifiers 0 through 2; a second associated with transaction identifiers 3 through 5; and a third associated with transaction identifiers 6 through 8. In this case, the first, second, and third transaction identifier ranges do not overlap. The non-overlapping condition with respect to transaction identifiers is referred to as the "compactness" condition with respect to transaction identifiers. However, the meeting of the compactness condition with respect to transaction identifiers does not mean that the compactness condition is met with respect to the log entries themselves.

For instance, referring back to FIG. 2, bracket 201 shows a range of entries in the log spanning from the first task of the first initiated transaction of a first transaction identifier range to the last task of the last completed transaction of the first transaction identifier range. Likewise, bracket 302 shows a range of entries in the log spanning from the first task of the first initiated transaction of a second transaction identifier range to the last task of the last completed transaction of the second transaction identifier range. Though the second transaction identifier range is non-overlapping with the first transaction identifier range, the brackets 201 and 202 do overlap. That is, there are some tasks that are bracketed by both brackets 201 and 202. This is because of the parallel processing nature of the computing system in that transactions are performed in parallel. Thus, the last task of the latest completed transaction in a prior non-overlapping transaction identifier range may indeed be completed after the first task of the first transaction of the subsequent non-overlapping transaction identifier range is initiated. Thus, transaction segments meet the compactness condition with respect to transaction identifiers, but do not guaranty or even aim to meet the compactness condition with respect to log entries.

Completing the example, bracket 203 shows a range of entries in the log spanning from the first task of the first initiated transaction of a third transaction identifier range to the last task of the last completed transaction of the third transaction identifier range. Again, though the third transaction identifier range is non-overlapping with the second transaction identifier range, the brackets 202 and 203 do overlap. This is again because last task of the latest completed transaction in a prior non-overlapping transaction identifier range may indeed be completed after the first task of the first transaction of the subsequent non-overlapping transaction identifier range is initiated.

Figure 3:
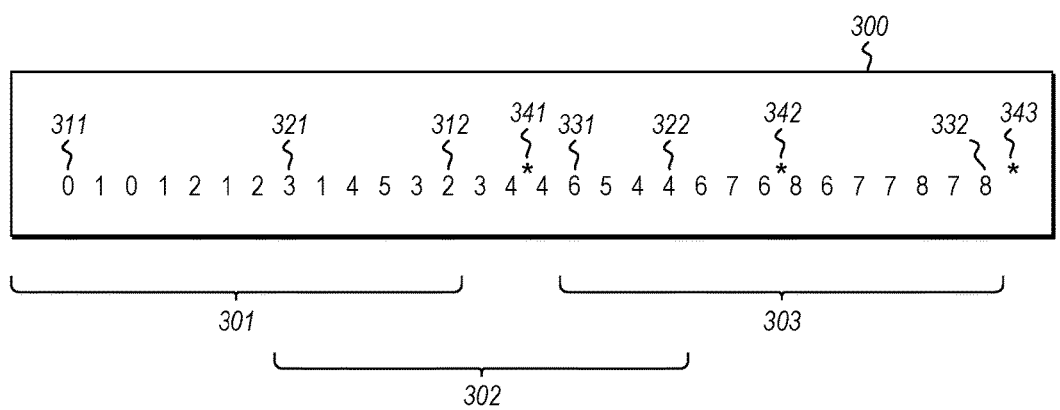
FIG. 3 illustrates a more specific example log that represents an example of the log of FIG. 2.

FIG. 3 illustrates a more specific example log 300 that represents an example of the log 200 of FIG. 2, in which the first brackets 301 is associated with transaction identifiers 0 through 2; the second brackets 302 is associated with transaction identifiers 3 through 5, and the third brackets 303 is associated with transaction identifiers 6 through 8. Each number within the log 300 represents a task entry having the number as the associated transaction identifier.

Figure 4:
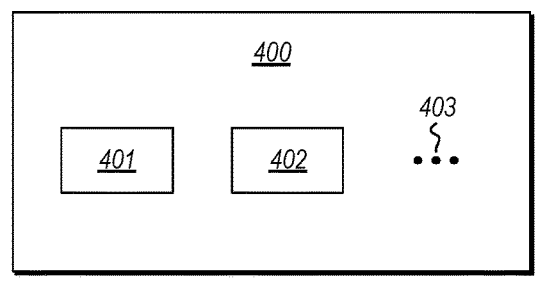
FIG. 4 illustrates a transaction segment record in accordance with the principles described herein.

FIG. 4 illustrates a transaction segment record 400 in accordance with the principles described herein. There may be a transaction segment record 400 created for each non-overlapping transaction identifier range. For instance, there may be a transaction segment record 400 for each of the non-overlapping transaction identifier ranges 301, 302 and 303 of FIG. 3.

The transaction segment record 400 includes the associated non-overlapping transaction identifier range 401, and also includes the associated log entry identifier range 402. An example of a log entry identifier is a log sequence number (LSN). Accordingly, an example of a log entry identifier range 402 is a log sequence number range. The transaction segment record 400 also includes potentially other fields 403, and thus is not limited to the transaction identifier range 401 and the log entry identifier range 402.

For the transaction identifier range 0 to 2 associated with the bracket 301, the transaction segment record 400 would identify the transaction identifier range 0 to 2 within field 401. The transaction segment record 400 would also include a log entry identifier range 402 beginning at the first task entry 311 associated with the first initiated transaction of the transaction identifier range and ending at the last task entry 312 associated with the last completed transaction of the transaction identifier range. The transaction segment record may then be placed in the log after the last task entry 312. For instance, asterisk 341 may represent the transaction segment record for transaction identifier range 0 to 2 spanning bracket 301.

For the transaction identifier range 3 to 5 associated with the bracket 302 the transaction segment record 400 would identify the transaction identifier range 3 to 5 within field 401. The transaction segment record 400 would also a log entry identifier range 402 beginning at the first task entry 321 associated with the first initiated transaction of the transaction identifier range and ending at the last task entry 322 associated with the last completed transaction of the transaction identifier range. The transaction segment record may then be placed in the log after the last task entry 322. For instance, asterisk 342 may represent the transaction segment record for transaction identifier range 3 to 5 spanning bracket 302.

For the transaction identifier range 6 to 8 associated with the bracket 303 the transaction segment record 400 would identify the transaction identifier range 6 to 8 within field 401. The transaction segment record 400 would also a log entry identifier range 402 beginning at the first task entry 331 associated with the first initiated transaction of the transaction identifier range and ending at the last task entry 332 associated with the last completed transaction of the transaction identifier range. The transaction segment record may then be placed in the log after the last task entry 332. For instance, asterisk 343 may represent the transaction segment record for transaction identifier range 6 to 8 spanning bracket 303.

In some embodiments, the confirmation that a transaction segment definition record is persisted allows the next one to be persisted. Therefore these transaction segment records will be in transaction identifier order in the log." Accordingly, in FIG. 3, the transaction segment record 341 associated with transaction identifier range 0 to 2 is placed in the log 300 prior to the transaction segment record 342 associated with the transaction identifier range 3 to 5. Likewise, the transaction segment record 342 associated with transaction identifier range 3 to 5 is placed in the log 300 prior to the transaction segment record 343 associated with the transaction identifier range 6 to 8.

Figure 5:
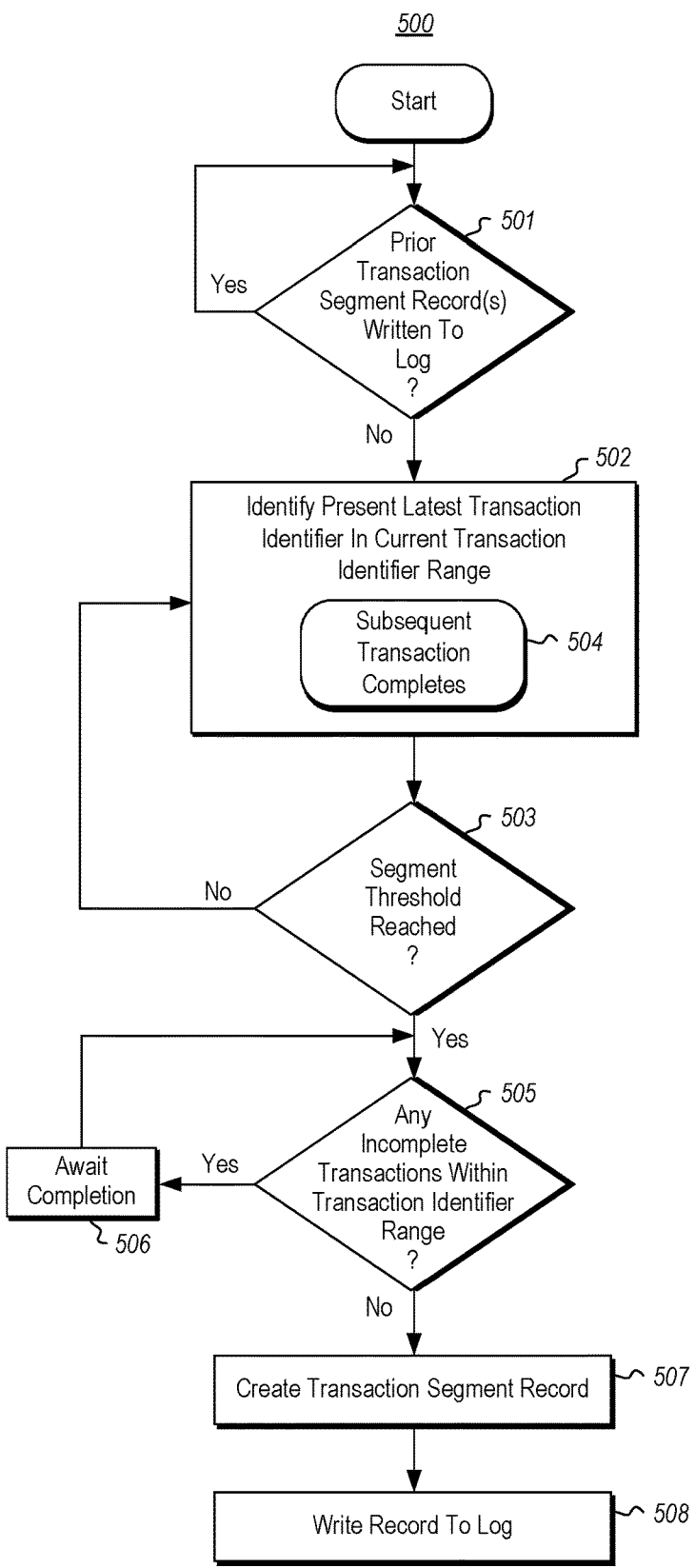
FIG. 5 illustrates a flowchart of a method for creating a transaction segment record, which may be used to create each transaction segment record in the sequence of transaction records.

FIG. 5 illustrates a flowchart of a method 500 for creating a transaction segment record, which may be used to create each transaction segment record in the sequence of transaction records. For instance, with reference to FIG. 3, the method 500 may be applied three times to generate transaction segment records 341, 342 and 343.

It is determined whether any prior transaction segment records, if any, in the sequence of transaction segment records have been written to the log (decision block 501). For instance, transaction segment record 341 is the first transaction segment record 341 in the sequence of three transaction segment records of FIG. 3. Accordingly, there are no prior transaction segment records that are to be written to the log ("Yes" in decision block 501). If the method 500 were being performed with respect to the transaction segment record 342, then transaction segment record 341 would first be written to the log in order to follow the "Yes" branch in the decision block 501 of FIG. 5. If the method 500 were being performed with respect to the transaction segment record 343, then transaction segment record 342 would first be written to the log in order to follow the "Yes" branch in the decision block 501 of FIG. 5. If there did exist prior transaction segment records that are yet to be written to the log ("No" in decision block 501), then the method 500 would simply await the writing of all prior transaction segment records in the sequence to be written to the log.

Upon determining that all prior transaction segment records have been written to the log ("Yes" in decision block 501), the latest present transaction identifier range of the transaction segment record is identified (act 502). The beginning of the transaction identifier range to the latest present transaction identifier defines a current transaction identifier range for the transaction segment record.

It is then determined whether a threshold has been reached with respect to the transaction segment (decision block 503) based on the current transaction segment identifier range. An example of such a threshold might be a time-based threshold. For instance, the transaction segment might remain open for a certain amount of time. Alternatively, the transaction segment might close upon encountering a time threshold since the last new transaction was encountered in the log. The principles described herein contemplate any threshold. In the description which follows, an example threshold will be described in term of a size threshold. For instance, the threshold size might be the sum of the size of all transactions having a transaction identifier within the current transaction identifier range. This size may be defined as the cumulative sum of all of the sizes of the transactions as expressed in binary representation. If the size of the transactions has not reached a particular threshold ("No" in decision block 503), then the method 500 returns to act 502.

Note that the present latest transaction identifier may change resulting in a new identification of the present latest transaction identifier (act 502) if transactions later than a present latest transaction identifier are detected as completed (event 504). This would result in expansion in the current transaction identifier range for the transaction segment record. Event 504 remains active as a possibility until the size of the transactions has reached a particular threshold ("Yes" in decision block 503). This would result in a transition in the state of the transaction segment record such that a change in the transaction identifier range is no longer accepted. Hereafter, this state transition is referred to a transition from an open state (in which the transaction identifier range may expand if transactions later than a present latest transaction identifier are detected thereby thereafter preventing further expansion of the transaction identifier range) to a closing state (in which the transaction identifier range does not expand).

Once this state transition occurs, it is then determined whether there are any transactions have a transaction identifier within the present transaction identifier range that have not yet completed (decision block 505), either by being committed or aborted. If all of the transactions having a transaction identifier within the transaction identifier range have not been completed ("No" in decision block 505), then the method awaits completion of all of such transactions (act 506). Otherwise, if all of the transactions having a transaction identifier within the transaction identifier range have been completed ("Yes" in decision block 505), then the transaction segment record is created (act 507), and placed into the log (act 508). The placing of the transaction segment record may result in a future iteration of the method 500 with respect to the subsequent transaction segment record branching along the "Yes" branch of FIG. 5.

Figure 6:
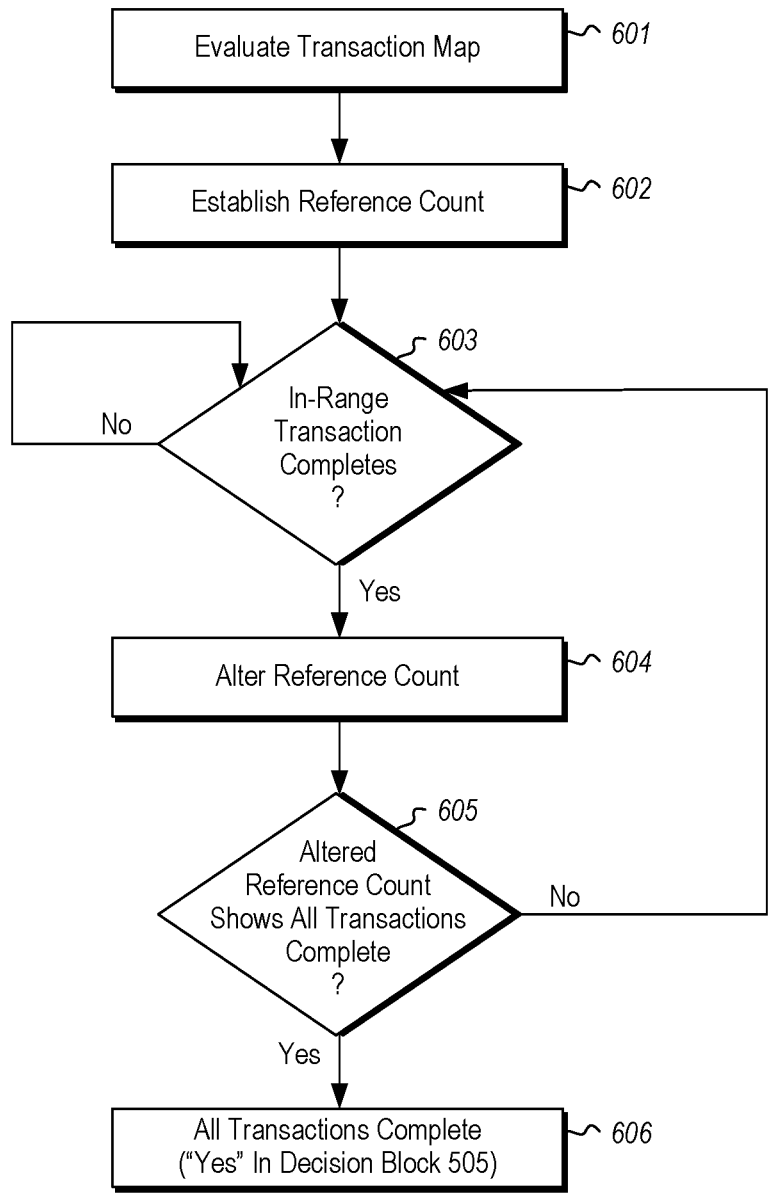
FIG. 6 illustrates a flowchart of a method for determining if there are any transactions having a transaction identifier within the present transaction identifier range that have not yet completed.

FIG. 6 illustrates a flowchart of a method 600 for determining if there are any transactions having a transaction identifier within the present transaction identifier range that have not yet completed. The method 600 represents one example of how decision block 505 might be performed. First, a transaction map is evaluated that shows active transactions according to transaction identifier (act 601). Then a reference count is established based on how many active transactions there are within the transaction identifier range (act 602) that have not yet completed. If a transaction having a transaction identifier within the transaction identifier range is not detected as completed ("No" in decision block 603), then the method 600 remains at decision block 603.

Thereafter, however, each time a transaction having a transaction identifier within the transaction identifier range is detected as completed ("Yes" in decision block 603), the reference count is altered (act 604) so as to represent a decrementing of the identified number of transactions within the transaction identifier range that having not yet completed. If the reference count still represents that one or more transactions are yet to be completed ("No" in decision block 605), then the method 600 returns to decision block 603 to await another indication that a transaction within range of the transaction identifier range has completed. Otherwise ("Yes" in decision bloc 605), if the reference count indicates that all transactions have completed, then the method 600 ends (act 606) resulting in a branching along the "Yes" branch of decision block 505 of FIG. 5. Again, this would result in creation of the transaction segment record (act 507) and the writing of the transaction segment record to the log (act 508).

Previously, this description has mentioned that when a transaction segment is in an open state, the transaction segment may receive notifications that new transactions have completed, resulting in potentially expansion of the current transaction identifier range. However, when the transaction segment transitions to a closing state, the transaction segment no longer expand the transaction identifier range associated with the transaction segment. In one embodiment, the open transaction segment may be represented by a data structure that is relatively small—such as perhaps 256 or even 128 bits or less. This allows changes to be made to the open transaction segment data structure in one processing cycle, thereby ensuring that changes to the open transaction segment data structure are made atomically. Thus, the open transaction segment data structure may be lockless, such that no locks need be taken on that data structure. Such allows for efficient management of the open transaction segment data structure such that millions of transactions may be processed per second.

Figure 7:
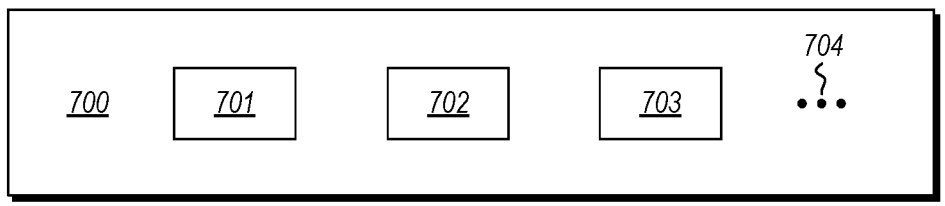
FIG. 7 illustrates an example of the open transaction segment data structure 700.

FIG. 7 illustrates an example of an open transaction segment data structure 700. Within the open transaction segment data structure 700 may be a number of fields including the beginning transaction identifier 701 and the current latest transaction identifier 702. The open transaction segment data structure 700 could also include a "can close" bit 703, representing that the transaction segment has reached a predetermined cumulative size (and thus branched along "Yes" in decision block 503). The open transaction segment data structure 700 may also include other fields as represented by ellipses 704). The method 500 causes there to be only one open transaction segment at a time. This is because the method 500 is not re-performed until the prior iteration of the method 500 has completed act 508, resulting in the transaction segment record being written to the log, and thereby initiating the method 500 for the next transaction segment along the "Yes" branch in decision block 501. Accordingly, there need only be a single open transaction segment data structure 700 at a time. This simplicity allows for high volume in handling transactions as each transaction segment passes through the open transaction segment data structure 700 as a gateway, allowing the transactions to be processed by a single thread and managing all information in a small data structure. The open transaction segment data structure 700 may be changed millions of times a second to handle millions of completed transactions per second.

Figure 8:
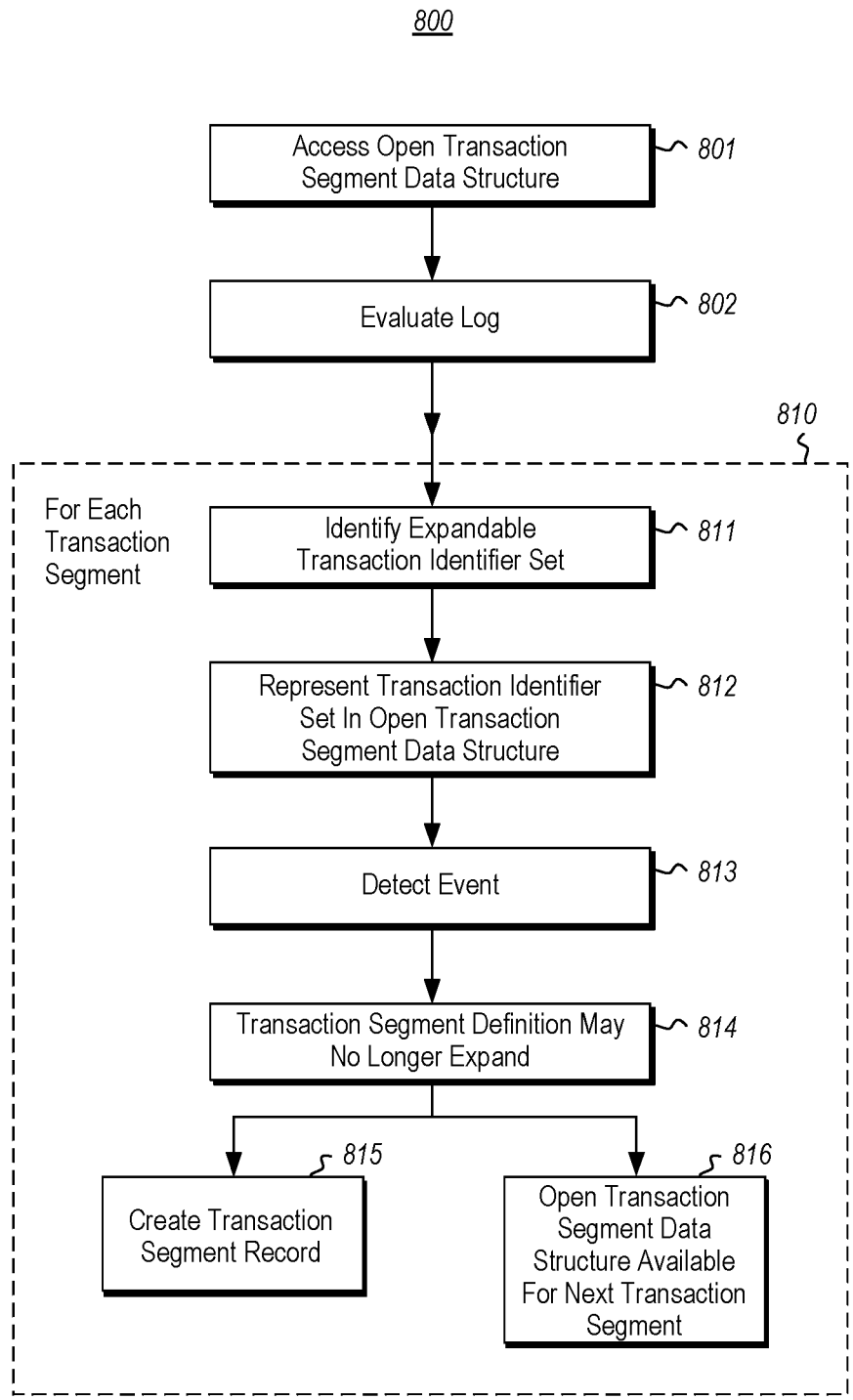
FIG. 8 illustrates a flowchart for a method for using an open transaction segment data structure to create a sequence of transaction segment records.

FIG. 8 illustrates a flowchart for a method 800 for using an open transaction segment data structure to create a sequence of transaction segment records. The method 800 includes accessing the open transaction segment data structure (act 801) and evaluating a log that includes multiple log entries associated with different transaction (act 802). For instance, the computing system 100 of FIG. 1 may access the open transaction data structure 700 of FIG. 7 (act 801), and also begin evaluation of the log 200 (act 802). In accordance with act 810, the open transaction segment data structure is then used to create the sequence of transaction segment records.

Specifically, as part of the act 810, the system identifies an expandable transaction segment definition (i.e., the expandable transaction identifier set or range) associated with an open transaction segment for which a transaction segment record is to be created (act 811). This was described above with respect to act 502 and event 504 of FIG. 5. So long as the event 504 is active due to the transaction segment being in an open state, the transaction segment definition remains expandable. The transaction segment definition while expandable may at least in some instances be expanded to include log entries of a particular transaction identifier if the last data item of that particular transaction identifier is encountered in the log. For instance, as described above, upon detection of event 504, the transaction segment may expand.

The method 800 then includes representing the expandable transaction segment definition within the open transaction segment data structure (act 812). For instance, the transaction segment collection data structure 700 has been described as representing the transaction segment definition within field 701. The field 701 may include an internally descriptive definition, or may simply point to another location that defines a full transaction segment definition.

Furthermore, upon detecting an event (act 813), it is determined that the transaction segment definition is no longer expandable. This has been described above with respect to the event 504 causing the transaction segment definition to expand, but once the transaction segment is determined to be a particular size ("Yes" in decision block 503), it is determined that the transaction segment definition may no longer expand (act 814). In response, the transaction segment record is created (act 507 and also act 815), and the open transaction segment data structure is also made available for use by the next collection (act 816). Note that act 816 is shown in parallel with act 815 to represent that there is no time dependency between the two acts. That said, unless the transaction segment record for the current transaction segment is generated, the next transaction segment is not closed. However, at the same time, when the current transaction segment is marked as full (act 814) (meaning it can no longer expand), events are classified to the next transaction segment—meaning that the next transaction segment is open for allocation often even before the transaction segment record is written to the log itself.

Figure 9:
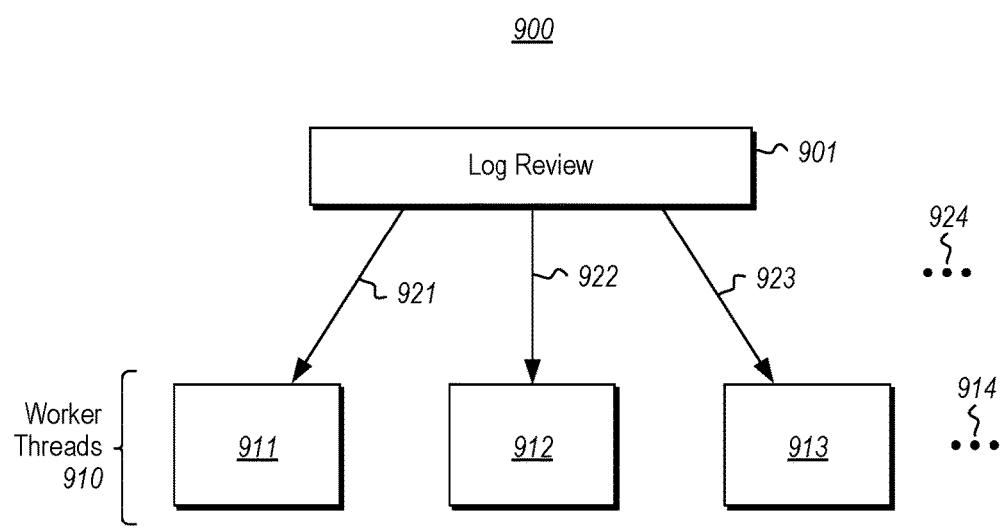
FIG. 9 illustrates an architecture associated with the use of a log that includes therein a sequence of transaction segment records, and that includes a sequence of tasks performed with respect to multiple transactions.

FIG. 9 illustrates an architecture 900 associated with the use of a log that includes therein a sequence of transaction segment records, and that includes a sequence of tasks performed with respect to multiple transactions. For instance, the architecture 900 may be used to process the log 200 of FIG. 2, or the log 300 of FIG. 3. The architecture 900 includes a log review module 901, and multiple worker threads 910. For instance, in FIG. 9, the worker threads are illustrated as three worker threads 911, 912 and 913, but the ellipses 914 represents that there may be any number of worker threads 910 in operation, and the number of worker threads in operation 910 may vary over time.

Figure 10:
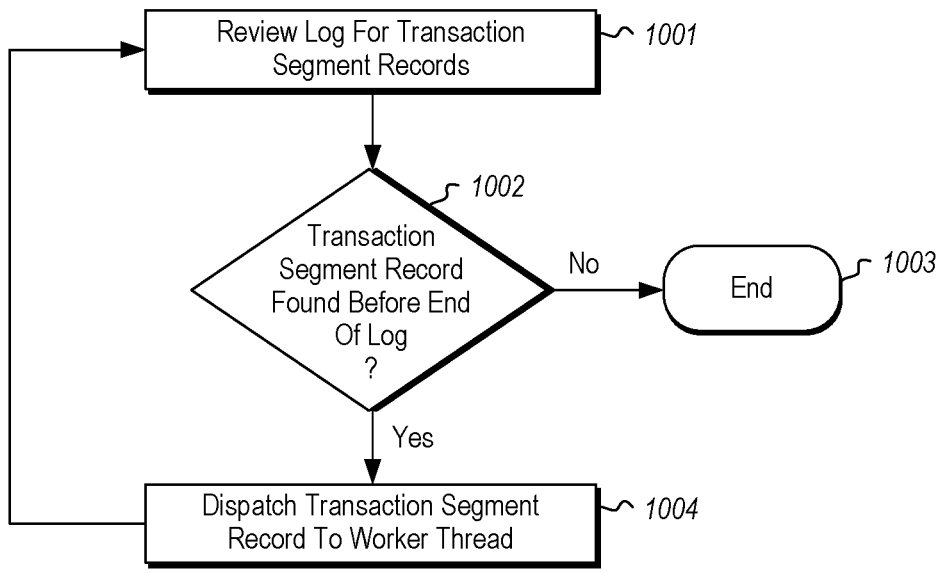
FIG. 10 illustrates a flowchart of a method for using the log from the perspective of the log review module of FIG. 9.

FIG. 10 illustrates a flowchart of a method 1000 for using the log from the perspective of the log review module 901 of FIG. 9. The log review module 901 reviews the log to find the sequence of transaction segment records (act 1001). Such a review may be performed quickly since most log entries may simply be skipped over upon confirming that the task entry is not a transaction segment record. Then, when the log review module finds a transaction segment record ("Yes" in decision block 1002), the corresponding transaction segment record is dispatched to a corresponding worker thread (act 1004). This may involve starting a worker thread if there is not previously a worker thread available. The log review module 901 thereafter continues to review the log (act 1001). Once the end of the log is encountered ("No" in decision block 1003), the method ends (act 1004).

For instance, applying the method 1000 of FIG. 10 and the architecture 900 of FIG. 9 to the example log 300 of FIG. 3, the log review module 901 would scan the log 300 (act 1001) until the transaction segment record 341 is found ("Yes" in decision block 1002). The log review module 901 would then dispatch (as represented by arrow 921) the transaction segment record 341 to a worker thread 911 (act 1004), and continue scanning the log (act 1001) for more transaction segment records.

The log review module 901 would next encounter transaction segment record 342 ("Yes" in decision block 1002). The log review module 901 would then dispatch (as represented by arrow 922) the transaction segment record 342 to a worker thread 912 (act 1004), and continue scanning the log (act 1001) for more transaction segment records.

The log review module would next encounter transaction segment record 343 ("Yes" in decision block 1002). The log review module 901 would then dispatch (as represented by arrow 923) the transaction segment record 343 to a worker thread 913 (act 1004), and continue scanning the log (act 1001) for more transaction segment records. However, no further transaction segment records are found in the log 300 ("No" in decision block 1003), and thus the method 300 would end (act 1003). If there were more transaction segment records and more worker segments (as represented by ellipses 913), then the method 1000 may be iterated further in order to dispatch (as represented by ellipses 924) the transaction segments to those other worker segments as well.

Figure 11:
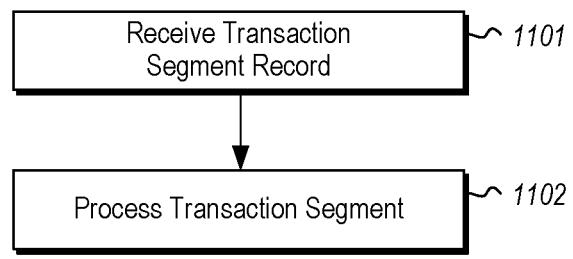
FIG. 11 illustrates a flowchart of a method for using the log from the perspective of any of the worker threads of FIG. 9.

FIG. 11 illustrates a flowchart of a method 1100 for processing the log from the perspective of any of the worker threads 910 of FIG. 9. The corresponding worker thread receives the transaction segment record (act 1101), and responsive thereto, processes the corresponding transaction segment (act 1102). For instance, in FIG. 9, the worker thread 911 receives (act 1101 and represented by arrow 921) the transaction segment record 341, and processes (act 1102) the transaction segment defined by the corresponding transaction segment 341. The worker thread 912 receives (act 1101 and represented by arrow 922) the transaction segment record 342, and processes (act 1102) the transaction segment defined by the corresponding transaction segment 342. Likewise, the worker thread 913 receives (act 1101 and represented by arrow 923) the transaction segment record 343, and processes (act 1102) the transaction segment defined by the corresponding transaction segment 343. Examples of processing (act 1102) the transaction segment include performing a redo of the transactions, such as perhaps during a recovery operation.

The log scanning and dispatching of transaction records of FIG. 10 may occur relatively quickly. In contrast, the processing of the transaction records of FIG. 11 may take a little more time. Thus, the processing of the log may be viewed as a quick dispatch (of FIG. 10) and parallel processing (of FIG. 11) operation. This allows the worker threads to process each transaction segment substantially in parallel, thereby allowing the log as a whole to be processed more quickly. Such parallel operations are facilitated by the fact that the transaction segment records themselves have compactness with respect to transaction identifiers. Thus, each worker thread may redo the transactions within the transaction identifier range without conflicting processing from other worker threads trying to also process tasks from that same transaction.

At least some embodiments described herein relate to the use of a skip element when redoing transactions, so as to avoid tracking dependencies between transactions assigned to different threads for parallel processing. For instance, suppose a first thread redoes a first transaction, and a second thread redoes a second transaction. Now suppose that there is a second task in the second transaction that depends on a first task in the first transaction, and that actually moots the first task. When the second thread comes to the second task in the course of redoing the second transaction, if the first task is not already performed, the second thread inserts a skip element associated with the object to be operated upon by the particular task, instead of actually performing the particular task upon the object. When the first thread later comes to the first task in the course of redoing the first transaction, the first thread encounters the skip element associated with the object. Accordingly, instead of performing the dependee task, the first thread skips the dependee task and perhaps removes the skip element. The net result is as though the dependee task and the particular task never happened at all, which is the same as the result had the dependee task been performed first followed by the particular task that nullified the dependee task.

As an example, the particular task might be to delete a row inserted by the dependee task. If the delete row operation were to happen first, there would be no row to delete, and so the thread can determine that there is a dependee task that has not yet been performed. Accordingly, rather than delete the row (which would be impossible anyway as it has not yet been inserted), the thread instead inserts a skip element associated with the row yet to be created. When the thread that inserts the row is encountered, instead of inserting the row, the thread encounters the skip element, and performs no action at all except for perhaps removing the skip element. The end result is the same (i.e., the row is not present), and dependencies are honored.

Figure 12:
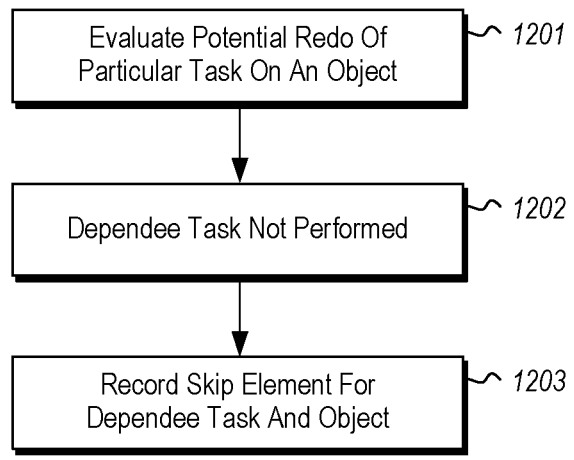
FIG. 12 illustrates a flowchart of a method for processing a particular task that has a dependee task that has not yet been performed.

FIG. 12 illustrates a flowchart of a method 1200 for processing a particular task that has a dependee task that has not yet been performed. For instance, the method 1200 may be performed by one of the worker threads 910 of FIG. 9 (e.g., worker thread 912).

First, the worker thread evaluates a potential redo of a particular task within the transaction segment (act 1201). As a result of the act of evaluating the potential redo of the particular task on the object, the worker thread determines that a dependee task for the particular task has not yet been performed (1202). The dependee task is a task that would be rendered moot by the particular task. For instance, the dependee task might be to insert to update the object (e.g., a row, table, or other data structure), whereas the particular task might be to delete the object. As an example, the evaluation (act 1201) of the potential redo might actually be an attempt to perform the redo of the particular task. If the attempt fails, then this result may be used as a determination that a dependee task for the particular task has not yet been performed.

As a result of the act of determining that the dependee task for the particular task has not yet been performed (act 1201), the worker thread associates a skip element with the object of the particular task with respect to the dependee task. The skip element is structured to be interpretable by another worker thread assigned to the transaction segment that includes the dependee task as an instruction to skip the dependee task.

Figure 13:
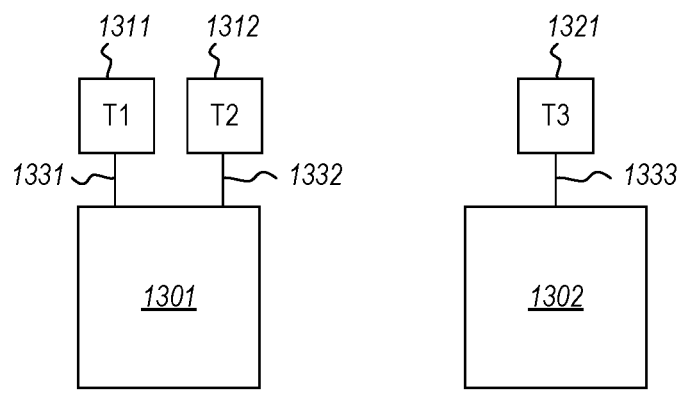
FIG. 13 illustrates an example environment in which there are two objects having associated skip elements.

FIG. 13 illustrates an example environment in which there are two objects 1301 and 1302. Object 1301 has associated therewith a skip element 1311 associated with a dependee task T1. For instance, suppose that a task t1 depends from and renders moot the performance of task T1, and that a worker thread attempted to perform task t1 prior to another worker thread performing dependee task T1. In that case, rather than performing the task t1, the worker thread that was supposed to redo task t1 records the skip element 1311 in a manner associated (as represented by line 1331) with the object 1301, and that is associated with task T1 (as represented by the skip element 1311 containing the text "T1").

Note that method 1200 may be performed multiple times with respect to the same object. For instance, in FIG. 13, suppose that the object has associated therewith another skip element 1311 that is associated with a task T2. For instance, a task t2 may also be a task to be performed on the object 1301 but which renders moot the performance of dependee task T2. In this case, rather than perform the task t2, the worker that that was supposed to redo the task t2 records the skip element 1312 in a manner associated (as represented by line 1332) with the same object 1301 and that is associated with task T2 (as represented by the skip element 1332 containing the text "T2").

In FIG. 13, there is another object 1302 that also has a skip element 1321 associated with it (as represented by line 1333), and that is associated with a particular task T3, (as represented by the skip element 1321 containing the text "T3"). A worker thread processing a single transaction may encounter numerous instances in which a dependee task has not yet been performed, and thus may associate appropriate skip elements with any number of objects for which there were particular tasks that were encountered during the redo process before their respective dependee tasks were performed.

Figure 14:
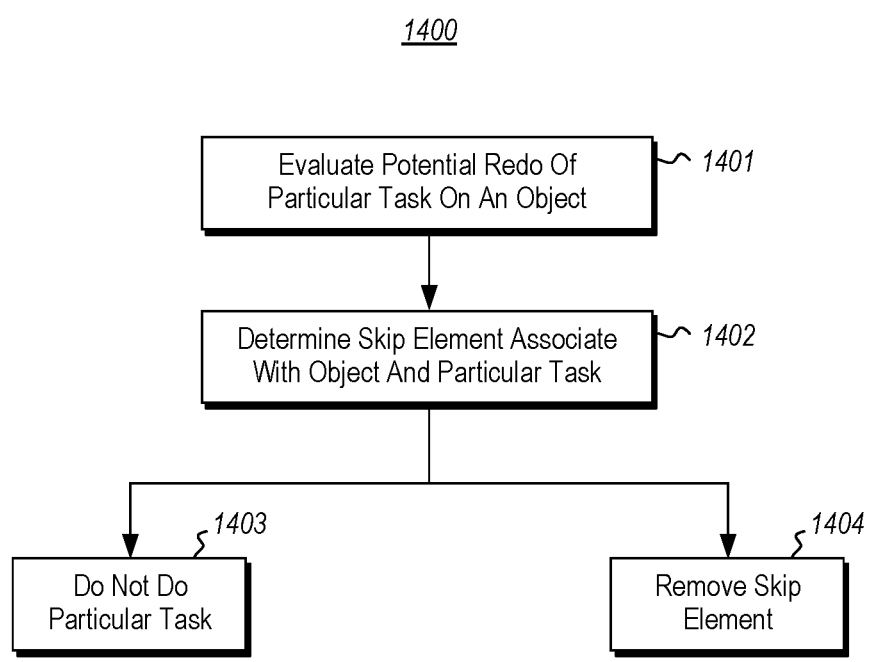
FIG. 14 illustrates a flowchart of a method for a worker thread to assist in redoing a particular task in a log from the perspective of a worker thread that performs the dependee task and finds associated with the object a skip element associated with the dependee task.

FIG. 14 illustrates a flowchart of a method 1400 for a worker thread to assist in redoing a particular task in a log. The method 1400 is from the perspective of a worker thread that performs the dependee task and finds associated with the object a skip element associated with the dependee task. In particular, the worker thread evaluating a potential redo of a particular task (i.e., the dependee task mentioned above) within the transaction segment (act 1401). The particular task is to perform an action on an object. As a result of the act of evaluating the potential redo of the particular task (act 1401), the worker thread determines that there is a skip element associated with the object of the particular task and that is applicable to the particular task (act 1402). As a result of the act of determining that the object has a skip element that is applicable to the particular task (act 1402), the worker thread does not redo the particular task (act 1403), and instead disassociates the skip element and the object (act 1404).

For instance, in the context of FIG. 13, suppose that a worker thread encounters a redo of the task T1 on the object 1301 in the process of redoing its associated transaction. The worker thread would encounter the skip element 1311 (act 1402), forgo performing the redo of the task T1 on the object 1301 (act 1403), and remove the skip element 1311 (act 1404). However, the skip element 1312 remains. Now suppose thereafter, that this worker thread or another worker thread encounters a redo of the task T2 on the object 1301 in the process of redoing its associated transaction. The worker thread would encounter the skip element 1312 (act 1402), forgo performing the redo of the task T2 on the object 1301 (act 1403), and remove the skip element 1312 (act 1404). Now suppose that a worker thread (which could be the same or different threads than those that encountered the redo of T1 and T2 on object 1301) encounters a redo of the task T3 on the object 1302. The worker thread would encounter the skip element 1321 (act 1402), forgo performing the redo of the task T2 on the object 1301 (act 1403), and remove the skip element 1312 (act 1404).

In the context of FIG. 13, the end result is the same as if the dependee tasks T1, T2 and T3 had been performed prior to their corresponding tasks t1, t2 and t3. After all, the tasks t1, t2 and t3 rendered moot the performance of corresponding tasks T1, T2 and T3. Accordingly, whether the dependee task was redone first or last, the net result is as though none of the tasks ever happened at all.

Accordingly, the principles described herein provide an effective mechanism for redoing transactions in a log in parallel while accounting for dependencies between transactions, and without the worker threads themselves ever having to keep track of the dependencies. Accordingly, processing of redo of transactions is improved while honoring dependencies between transactions.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
   one or more processors;
   a computer-readable storage media having thereon computer-executable instructions that are structured such that, when executed by the one or more processors causes the computing system to perform a method for managing a transaction log that has an associated plurality of transaction segment records, the method comprising:
   reviewing a first transaction segment record to identify a first transaction segment definition;
   accessing the first transaction segment using the first transaction segment definition;
   redoing processing of the first transaction segment by at least performing the following:
      evaluating a potential redo of a first task within the first transaction segment;
      as a result of evaluating the potential redo of the first task on a first object, identifying a different task, the different task being both a task that is rendered moot by the first task and a task that is part of a second transaction segment and is operable on a second object; and
      as a result of determining that the different task is rendered moot by the first task, associating a skip element with the second object with respect to the different task, wherein the skip element is interpretable to cause the different task to be skipped during subsequent processing of the second transaction segment; and
   redoing processing of the second transaction segment by at least performing the following:

accessing the second transaction segment using a second transaction segment definition;
encountering the skip element associated with the second object; and
as a result of encountering the skip element, skipping the different task by refraining from performing the different task on the second object.

2. The computing system in accordance with claim 1, the first task comprising deleting the first object.

3. The computing system in accordance with claim 1, the first task being a first particular task, the different task being a first dependee task, the skip element being a first skip element, wherein redoing processing of the first transaction segment further includes:
evaluating a potential redo of a second particular task within the first transaction segment;
as a result of evaluating the potential redo of the second particular task on the second object, determining that a second dependee task of the second particular task has not yet been performed, the second dependee task being a task that is rendered moot by the second particular task; and
as a result of determining that the second dependee task for the second particular task has not yet been performed, associating a second skip element with the second particular task with respect to the second dependee task, wherein the second skip element is interpretable during subsequent processing of a transaction segment other than the first transaction segment and that includes the second dependee task as an instruction to skip the second dependee task.

4. The computing system in accordance with claim 1, the first transaction segment definition comprising a transaction identifier range.

5. The computing system in accordance with claim 4, the first transaction identifier range comprising a single transaction identifier.

6. The computing system in accordance with claim 4, the first transaction identifier range comprising a plurality of transaction identifiers.

7. A computing system comprising:
one or more processors;
a computer-readable storage media having thereon computer-executable instructions that are structured such that, when executed by the one or more processors causes the computing system to perform a method for assisting in redoing a transaction segment of a log that has an associated plurality of transaction segment records each representing an associated transaction segment of a log, wherein the method includes the computing system performing the following:
reviewing a transaction segment record to encounter a transaction segment definition;
accessing the transaction segment using the transaction segment definition; and
redoing the transaction segment by at least performing the following:
evaluating a potential redo of a particular task within the transaction segment by at least attempting to perform the particular task for operation on an object;
as a result of evaluating the potential redo of the particular task, determining that there is a skip element that is associated with the object of the particular task and that is applicable to the particular task due to the particular task being rendered moot by a different task in a different transaction segment; and
as a result of determining that the object has a skip element that is applicable to the particular task, refraining from redoing the particular task.

8. The computing system in accordance with claim 7, the method further comprising the following as a result of determining that the object has a skip element that is applicable to the particular task:
disassociating the skip element and the object.

9. A computing system in accordance with claim 7, the particular task being a first particular task, the skip element being a first skip element, the method further comprising at least the following during redoing the transaction segment:
evaluating a potential redo of a second particular task within the transaction segment;
as a result of evaluating the potential redo of the second particular task, determining that there is a second skip element associated with the object and that is applicable to the second particular task; and
as a result of determining that the object has a second skip element that is applicable to the second particular task, refraining from redoing the second particular task.

10. The computing system in accordance with claim 9, the method further comprising the following:
disassociating the first and second skip elements from the object.

11. The computing system in accordance with claim 7, the transaction segment being a first transaction segment, the transaction segment record being a first transaction segment record, the transaction segment definition being a first transaction segment record, the particular task being a first particular task, the skip element being a first skip element, the method further comprising the following:
accessing a second transaction segment record for a second transaction segment;
reviewing the second transaction segment record to encounter a second transaction segment definition;
accessing the second transaction segment using the second transaction segment definition; and
redoing the second transaction segment by at least performing the following:
evaluating a potential redo of a second particular task within the second transaction segment, the second particular task comprising an operation on the object;
as a result of evaluating the potential redo of the second particular task, determining that there is a second skip element associated with the object and that is applicable to the second particular task; and
as a result of determining that the object has a second skip element that is applicable to the second particular task, an act of refraining from redoing the second particular task.

12. A computer-implemented method for managing a transaction a log that has an associated plurality of transaction segment records, the method comprising a computer system comprising one or more processors performing the following:
reviewing a first transaction segment record to identify a first transaction segment definition;
accessing the first transaction segment using the first transaction segment definition;
redoing processing of the first transaction segment by at least performing the following:
evaluating a potential redo of a first task within the first transaction segment;

as a result of evaluating the potential redo of the first task on a first object, identifying a different task, the different task being both a task that is rendered moot by the first task and a task that is part of a second transaction segment and is operable on a second object, wherein the different task is rendered moot in that completion of the different task is unnecessary in view of the completion of the first task on the first object; and as a result of determining that the different task is rendered moot by the first task, associating a skip element with the second object with respect to the different task, wherein the skip element is interpretable to cause the different task to be skipped during subsequent processing of the second transaction segment.

13. The method in accordance with claim 12, the first task comprising deleting the first object.

14. The method in accordance with claim 12, the first task being a first particular task, the different task being a first dependee task, the skip element being a first skip element, wherein redoing processing of the first transaction segment further includes:

evaluating a potential redo of a second particular task within the first transaction segment, the second particular task corresponding to an operation on the second object;

as a result of evaluating the potential redo of the second particular task on the second object, determining that a second dependee task for the second particular task has not yet been performed, the second dependee task being a task that would be rendered moot unnecessary by the second particular task; and as a result of determining that the second dependee task for the second particular task has not yet been performed, associating a second skip element with the second object of the second particular task with respect to the second dependee task, the second skip element being structured to be interpretable during subsequent processing of a transaction segment other than the first transaction segment and that includes the second dependee task as an instruction to skip the second dependee task.

15. The method in accordance with claim 12, the first transaction segment definition comprising a transaction identifier range.

16. The computing system in accordance with claim 15, the first transaction identifier range comprising a single transaction identifier.

17. The computing system in accordance with claim 15, the first transaction identifier range comprising a plurality of transaction identifiers.

18. A computer-implemented method for assisting in redoing a transaction segment of a log that has an associated plurality of transaction segment records each representing an associated transaction segment of a log, the method comprising a computer system comprising one or more processors performing the following:

reviewing the transaction segment record to encounter a transaction segment definition;

accessing the transaction segment using the transaction segment definition; and redoing the transaction segment by at least performing the following:

evaluating a potential redo of a particular task within the transaction segment by at least attempting to perform the particular task for operation on an object;

as a result of evaluating the potential redo of the particular task, determining that there is a skip element associated with the object of the particular task and that is applicable to the particular task due to the particular task being rendered moot by a dependent task in a different transaction segment, wherein the particular task is rendered moot on account of the dependent task rendering the particular task unnecessary to complete during a redo operation; and as a result of determining that the object has a skip element that is applicable to the particular task, refraining from redoing the particular task that was mooted by the dependent task.

19. The method in accordance with claim 18, the particular task being a first particular task, the skip element being a first skip element, the method further comprising at least the following during redoing the transaction segment:

evaluating a potential redo of a second particular task within the transaction segment;

as a result of evaluating the potential redo of the second particular task, determining that there is a second skip element associated with the object and that is applicable to the second particular task; and as a result of determining that the object has a second skip element that is applicable to the second particular task, refraining from redoing the second particular task.

20. The method in accordance with claim 18, the method further comprising the following:

disassociating the first and second skip elements from the object.

* * * * *